April 17, 1951 F. L. STEGHART 2,549,342
METHOD AND APPARATUS FOR PASTEURIZING LIQUIDS
Filed Oct. 17, 1947 4 Sheets-Sheet 1

INVENTOR
FRITZ LUDWIG STEGHART
BY Otto Munk
HIS ATTY

INVENTOR
FRITZ LUDWIG STEGHART
BY Otto Munk
HIS ATTY

April 17, 1951　　　　F. L. STEGHART　　　　2,549,342
METHOD AND APPARATUS FOR PASTEURIZING LIQUIDS
Filed Oct. 17, 1947　　　　　　　　　　4 Sheets-Sheet 3
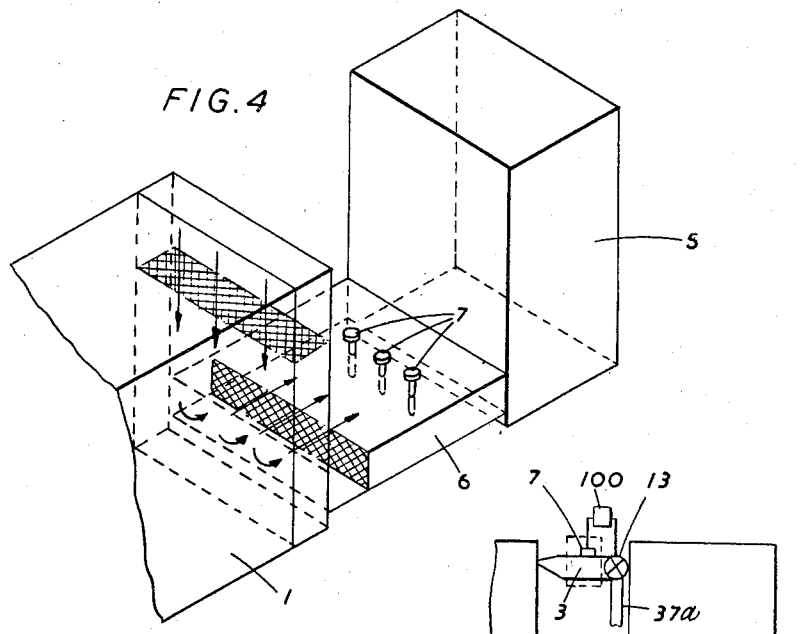
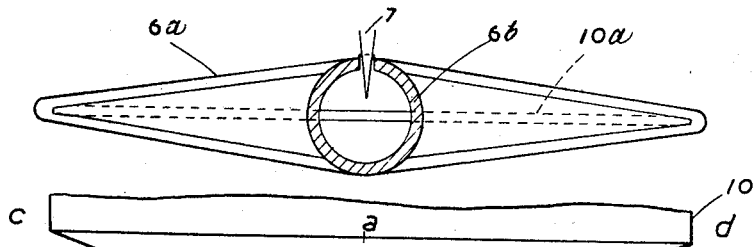
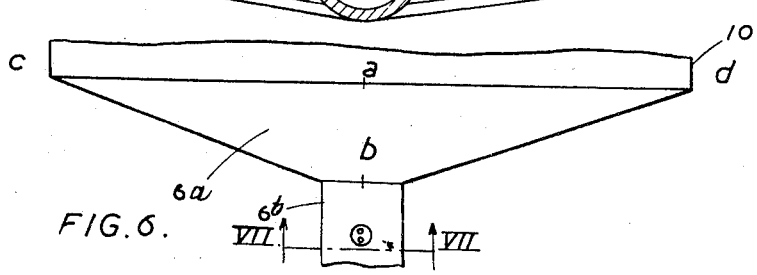
INVENTOR
FRITZ LUDWIG STEGHART
BY Otto Munk
HIS ATTY Patented Apr. 17, 1951

2,549,342

UNITED STATES PATENT OFFICE 2,549,342

METHOD AND APPARATUS FOR PASTEURIZING LIQUIDS

Fritz Ludwig Steghart, St. Albans, England, assignor to Tinsley (Industrial Instruments) Limited, London, England, a British company Application October 17, 1947, Serial No. 780,508
In Great Britain October 18, 1946

6 Claims. (Cl. 99—212)

This invention relates to methods of and apparatus for pasteurising liquids, particularly milk.

Apart from the very important holding time it is necessary to control the temperature of milk which is passing through a pasteurising plant with a great degree of accuracy. According to the present regulations in Great Britain it is, for instance, necessary that the milk should be kept at a temperature not less than 162° F. for at least 15 seconds. The determination of the actual temperature of that milk is very difficult because the changes in the temperature are very rapid and only the fastest means of measurement such as thermocouples connected to electronic amplifiers are capable of following the quick changes in the temperature of the milk which, as I have proved recently, amounts sometimes to 10-20° F. per second and is, therefore, at least 10 times faster than was assumed by experts. This, however, is not the only problem.

In pasteurising plant of a design as used quite generally at present, the speed of changes of temperature becomes less and less with the progress of the milk in the holder in which it is measured at present and it is, therefore, obvious that something is altogether wrong in principle with that method of measurement.

My aforesaid investigations show that milk entering the holder is mixed, after a very short progress, with other milk that is pasteurised at different times and a wave front of any temperature change is thereby smoothed out.

Efficient mixing of the milk takes place in the heating device, but the holder is a large vessel in which the milk is only inefficiently mixed. Accordingly there is a danger that if particles of relatively hot milk and of relatively cold milk reach the holder in rapid succession, the mixing in the holder is insufficiently good to cause the colder particles to absorb heat from the hotter particles. Consequently milk strata of different temperatures are liable to form, particularly if, for any reason, the mixing in the heating device becomes less efficient. Such strata, on coming into contact with the temperature change detecting apparatus will cause it to give a misleading indication.

In order to overcome this disadvantage the invention provides a method of pasteurising liquids includes the steps of passing the liquid through a heating device to a holder for the heated liquid, maintaining the averaged speed of the liquid, after leaving the heating device, at a valve not substantially less than that of the average speed of the liquid while passing through the heating device, over a predetermined length of its flow path adjacent to the heating device, and measuring the temperature of said liquid at a point in said predetermined length.

The invention also includes apparatus for carrying out the method according thereto, said apparatus including a heating device for the liquid, a holder for collecting the heated liquid, a relatively short conduit between said heating device and said holder, said conduit having a cross sectional area not substantially greater than that of the liquid conduit emerging from the heating device, and a temperature detector exposed to liquid passing through said conduit.

If desired two or more temperature detectors may be employed.

In order that the invention may be more completely understood one embodiment thereof as applied to a milk pasteuriser will now be described by way of example with reference to the accompanying diagrammatic drawings in which.

Figure 2:
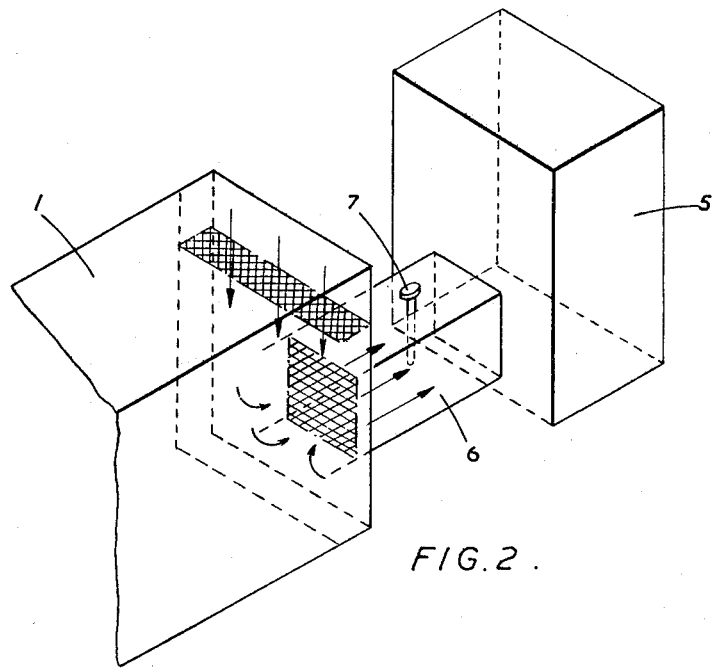
Figure 2 is a diagrammatic view of the heating device and holder with a connecting conduit of square cross section.
Figure 3:
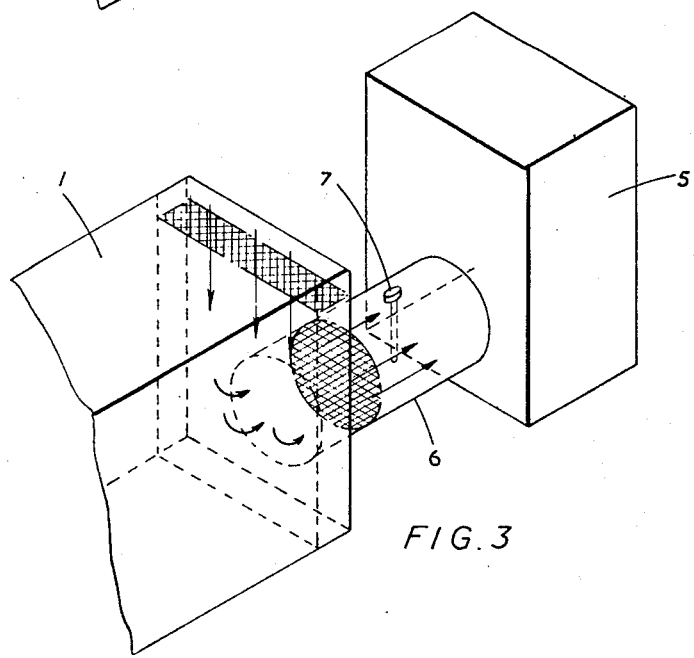
Figure 8:
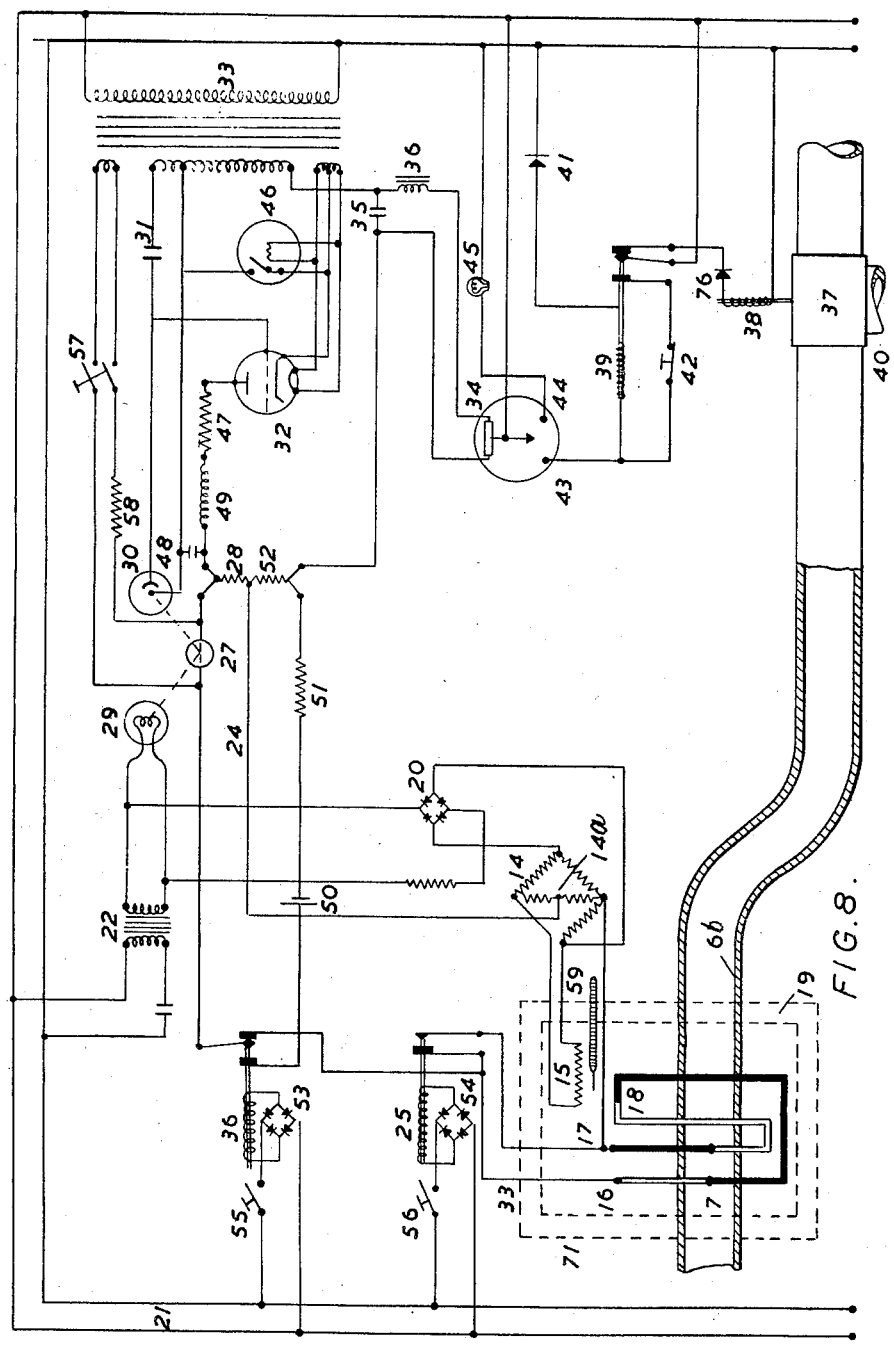

Figure 3 is a view similar to Figure 2 showing a connecting conduit of circular cross section, Figure 4 is another view similar to Figure 2 showing a connecting conduit having the same cross section as that of the passage for the liquid through the heating device, Figure 5 shows a further arrangement including a flow diversion valve on the connecting conduit, Figure 6 illustrates diagrammatically one form of conduit in plan, Figure 7 shows this conduit in section on the line VII—VII in Figure 6, and Figure 8 is a wiring diagram of one form of control of a flow diversion valve employing the invention.

Figure 1:
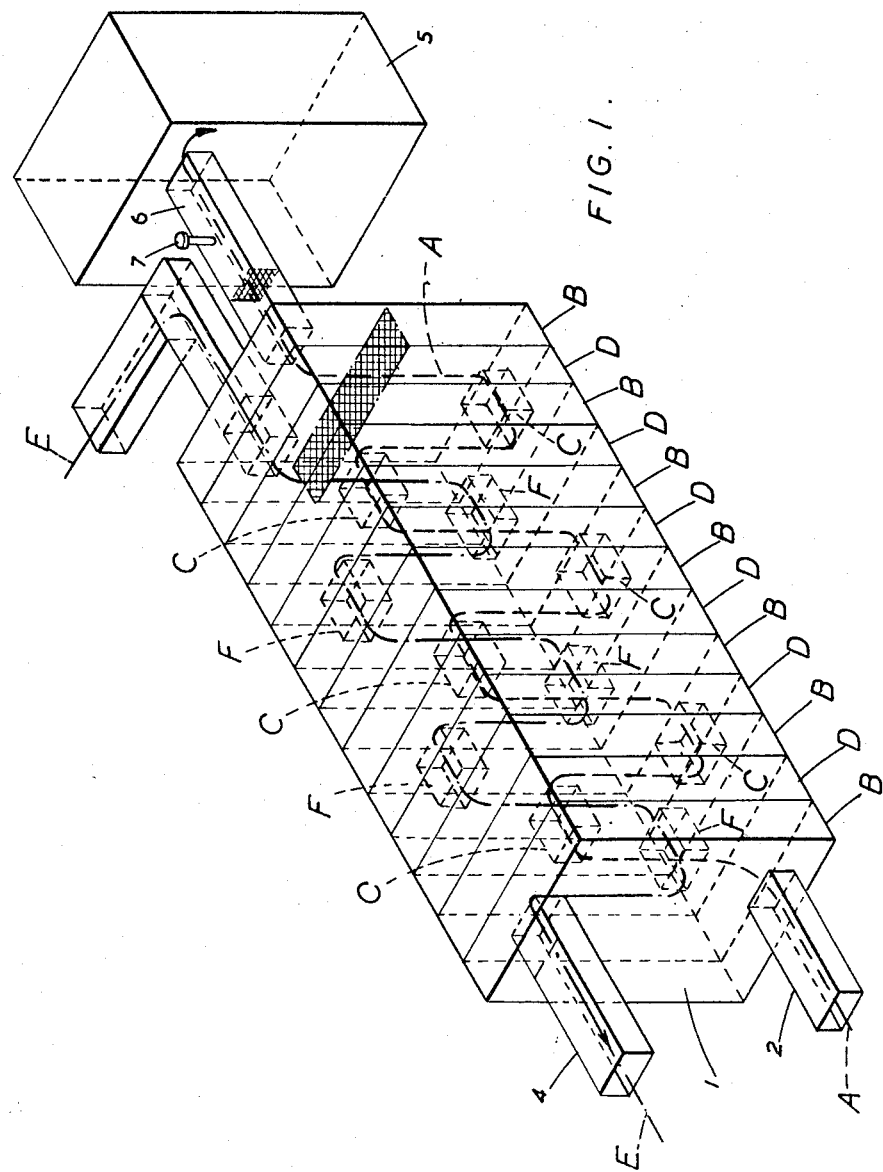
Figure 1 is a diagrammatic view of the heating device and holder with a connecting conduit of rectangular cross section.

In the construction shown in Figure 1, the milk heater in the form of a heat exchanger is shown at 1, the milk entering through the conduit 2 and flowing along the path indicated by the chain line A through the sections marked B which are connected by the passages indicated at C.

During its passage through the heater the milk is heated in the usual manner by hot water passing through the heater in the opposite direction, the hot water entering by the conduit 3 and passing through the sections D along the path indicated by the dotted line E. The sections D are connected by the conduits F. The water leaves the heater by the conduit 4.

After leaving the heater the milk enters a holder 5 which is connected by a relatively short conduit 6 to the outlet for the milk from the heater 1.

The conduit 6 is of rectangular cross section and has the same cross sectional area as that of the passage through which the milk flows while in the heater. Disposed in the conduit 6 is a temperature detector such as a thermocouple indicated diagrammatically at 7 which is used to operate a flow diversion valve when the temperature of the milk in conduit 6 falls below a predetermined value.

Figure 2 is a further diagram showing a modification in which the cross section of the conduit 6 is square while still being of the same cross sectional area as that of the passage through which the milk flows while in the heater 1.

Figure 3 shows a further modification in which the short conduit 6 is of circular cross section, and Figure 4 shows diagrammatically a conduit 6 which has the same cross section as that of the passage through which the milk flows while in the heater.

In the construction shown in Figure 4, owing to the large width of the conduit 6 in relation to its depth, a plurality of temperature detectors 7 (for example three) may be used which may be connected to the circuit for operating the flow diversion valve which may be connected in turn by means of a rotary switch to the circuit for operating the flow diversion valve.

In the construction illustrated in Figure 5, the milk heater is indicated at 1 and the holder at 5. The heater is of the usual construction employed in present practice in which the milk flows through a ribbon-like passage measuring about 20 inches by ¼ inch, outside which passage flows a heating medium, usually hot water.

The milk passage in the heater 1 is connected to the receiver 5 by a short conduit 6 which, in accordance with the invention is so shaped that the average speed of the milk passing through the conduit 6 is equal to the speed of the milk passing through the ribbon-like passage within the heater.

To this end the conduit 6 is shaped as shown diagrammatically in Figures 6 and 7.

Referring to Figures 6 and 7, the ribbon-like passage for the milk within the heater is indicated at 10 and has the cross section shown at 10a. The connecting conduit 6 includes two parts 6a and 6b, of which the part 6b is of circular section having the same cross-sectional area as that of the passage 10. The part 6a is so shaped internally that at all planes of section parallel to the plane indicated at c—d the cross sectional area of the part 6a is equal to the cross sectional area of the passage 10 and therefore also of the part 6b of the conduit 6.

Thus the average speed of the milk in the parts 6a and 6b of the conduit 6 is the same as that of the milk in the passage 10.

The temperature of the milk in the part 6b of conduit 6 is measured by means of two thermocouples indicated diagrammatically at 7 and serving to control a flow diversion valve 37 disposed in conduit 6b to divert the milk from conduit 6b through a pipe 37a back to the heater 1 if the temperature of the milk should fall below a predetermined value.

The control circuit for the flow diversion valve 37 is indicated diagrammatically at 100 in Figure 5 and may be the same as that shown in the accompanying Figure 8 and described in British patent specification No. 565215.

In the construction shown in Figures 5 to 7, the cross sectional area of the relatively short conduit 6 is the same as that of the heat exchanging conduit 10 and accordingly the speed of the individual particles of liquid is unaffected by the change from the heat exchanging conduit to the relatively short conduit and therefore the speed of each particle within the short conduit remains constant thereby obviating a mixture of relatively cool particles with relatively hot particles.

If necessary the relatively short conduit may be insulated to maintain the temperature of the liquid passing through it constant.

Although in the construction described above with reference to Figures 5 to 7, the circular portion 6b of the short conduit is connected to the ribbon-like passage 10 by a portion 6a which at all points along its length has the same cross sectional area as that of the passage 10, the circular portion 6b may be connected to the passage 10 by a portion similar to 6a but of which the cross sectional area is not constant throughout its length.

In this case it is unavoidable that the speed of the particles of liquid undergo a certain change when the form of the liquid stream is altering from that of a ribbon to that of a column but in the tube itself the average speed of the liquid will be about the same as that in the ribbon and while certain alterations of the wave front are unavoidable it is negligible as compared with those which arise in constructions hitherto employed, in which the temperature of the liquid is measured only after its speed is greatly reduced in the receiving vessel and in many instances the liquid stream is even broken up by grids which are interposed in its path.

If desired the relatively short conduit 6 may be constituted by an extension of the ribbon-like passage 10 beyond the effective heating zone, or the portion 6b may have a cross section of which the shape is other than circular for example elliptical or rectangular of which the cross sectional area is equal to that of the heat exchanging conduit.

Further if desired the cross sectional area of the part of the short conduit 6 in which the temperature detector is mounted may have a cross sectional area slightly smaller than that of the passage 10 whereby the speed of the milk through the conduit 6 is increased in comparison with its speed through the heating device 1.

The electrical circuit for controlling the flow diversion valve from the temperature detector is illustrated in Figure 8.

Referring to Figure 8, two thermocouples 12 are connected in series to each other and to a part of the galvanometer diagonal 14a of a Wheatstone bridge 14, of which one arm is a resistance thermometer 15. The resistance thermometer is shown diagrammatically but in practice it is placed as near as possible to the conduit 6b so that its temperature differs very slightly if at all from the temperature of the conduit 6b. The resistance thermometer 15 is installed near to the junctions 16, 17 and 18 of the thermocouples 12. One end of the thermocouples and parts 15—18 are placed in a good thermal conductor 71 (as described later) which in turn is thermally insulated for instance by a package 19 made of glass wool. This thermal insulator serves to prevent any heat dissipation from the parts 15—18 and to keep them as near as possible to the temperature of the conduit 6b.

The bridge 14 need not necessarily be located close to the rest of the circuit but when the temperature is as low as it is in the present case, there is no disadvantage in so doing. The bridge 14 is fed from a rectifier 20 the alternating current to which is supplied from the mains 21, through the stabiliser unit 22 which serves to reduce as far as possible fluctuations in the mains current. The E. M. F. obtained from the resistance 13 which forms the galvanometer diagonal of the Wheatstone bridge 14 is superimposed on the E. M. F. emanating from the thermocouples 12, and the sum of the two E. M F.'s could be measured from the leads 23 and 24.

Light from a lamp 29, also fed from the stabiliser 22 falls onto the mirror of the galvanometer 27 and from there is reflected onto a photocell 39. The photocell 39 is part of a potentiometer circuit, the second part of which is a condenser 31. The point of the potentiometer circuit between the photocell 39 and the condenser 31, is connected to the grid of a gas filled thermionic relay 32. The amplifier thus formed is fed from the mains supply 21 through a transformer 33 and the anode current of the valve 32 is connected to an indicating measuring instrument 34 after being smoothed out by means of a condenser 35 and a choke 36.

The valve 32 in the present example is a gas filled triode which is operated by A. C. mains current in which the output current from the valve is controlled by preventing the start of the flow of anode current over a part of the positive half wave so that the flow of anode current starts at such a point that the mean anode current fed back to the input compensates for the input voltage.

The amplifier further contains a time relay 46 to make sure that the heater of the valve 32 is switched on for some time before anode current is passed. A series resistance 47 is provided to reduce the discharge current of the condenser 35 whilst a condenser 48 and a choke 49 reduce high frequency disturbances.

A standard cell 50 is also provided which may be used to check the indicating measuring instrument 34 and the amplifier, the current from the standard cell 50 being reduced by means of a resistance 51. The standard resistance 28 is used for checking purposes together with standard resistance 52. For this purpose the lead 23 is connected to one contact of a relay 25 and thence to the fixed contacts of a relay 26 the movable contact of which leads to the input of the circuit of the above described amplifier and in the present instance places the lead 23 in circuit with one side of the galvanometer 27 and from there through the standard resistance 28 back to the lead 24.

The relays 25 and 26 are in circuit with the mains supply 21 through rectifiers 54 and 53 respectively and these circuits can be completed by means of press button switches 56 and 55 for carrying out a checking operation as described later.

If the galvanometer 27 should become stuck for example because the instrument has been out of use for some time, alternating current obtained from transformer 33 can be put on to its terminals by operating a press button switch 57 in a circuit containing a resistance 58, which reduces the current to suitable values.

The voltage on the leads 23 and 24 is measured by the current therefrom being passed through the galvanometer 27, the mirror of which starts to deflect and so alters the amount of light falling on to the photocell 30. The potentiometer circuit including the photocell 39 and the condenser 31 is now unbalanced since the light falling on the photocell decreases the resistance of the former and current begins flowing through valve 32 after the grid voltage and phase have been altered. This current passes the resistance 47 and choke 49 and standard resistances 28 and 52 and through the smoothing arrangement comprising the condenser 35 and the choke 36 then through the coil of the indicating measuring instrument 34 and back to the cathode. When the anode current traverses the standard resistance 28 an E. M. F. is introduced into the galvanometer circuit 27, and the lead 24, which is in opposition to the voltage which is to be measured. A stable condition will soon be reached and since the voltage in the leads 23 and 24 is in opposition to the voltage from the anode current from the standard resistance 28, the anode current of the valve will be proportional to the input voltage. The anode current that causes feed back serves substantially to zeroise the galvanometer.

The diversion valve 37 has an operating coil 38 and as long as the coil 38 receives current from the mains 21 the valve allows the milk to pass normally through the conduit 6b to the holder 2. If, however, this current is interrupted by means of a relay 39 the plunger of the valve 37 drops and the milk is diverted into the pipe 37a from where it is led back to the heater 1.

The relay 39 and also the coil 38 receive operating current from the alternating current mains 21 through rectifiers 41 and 76 respectively. The relay 39 is of a self-holding type and a switch 42 is provided to interrupt the self-holding circuit if desired. One side of the coil of the relay 39 is connected to the mains and the opposite side of that coil to a contact 43, arranged in the path of the pointer of the indicating measuring instrument 34 or a part moving in sympathy therewith. A further contact 44 is connected through a lamp 45 to the mains 21 and the other line of the mains is connected to the pointer of the indicating measuring instrument 34 or to the part moving in sympathy therewith. Thus, if the pointer contacts the contact 43 the relay 39 is operated, whilst should it move in the opposite direction and contact the contact 44 the lamp 45 lights up.

The Wheatstone bridge 14 is designed in such a way that an increase in temperature of the resistance thermometer 15 leads to an increase of the voltage across the resistance 13 and at the same time the increase in the temperature of the milk by its influence on the bare thermocouples 12, increases the E. M. F. in the whole circuit in the same direction. The arrangement works as follows:

As long as the milk flowing through conduit 6b, has a uniform temperature of, for instance 162°, the thermocouples 12, the resistance thermometer 15 and the junctions 16, 17, 18 will all be at the same temperature. The bridge 14 is just a little unbalanced so that a small positive E. M. F. is obtained, amplified and indicated on the measuring instrument 34. Since the bridge 14 is very nearly balanced small voltage fluctuations that pass the stabiliser 22 will have only a negligible influence on the small range of temperatures indicated by the measuring instrument 34.

If the temperature of the milk falls, however, rapidly, then the temperature difference between the resistance thermometer 15 and the junctions 16, 17, and 18 on one side and of the thermocouple junctions 12 on the other side, will have an instantaneous effect by reducing the voltage that previously existed at the ends of the leads 23 and 24. The effect of this reduction of voltage is to cause a movement of the galvanometer 27 so that its mirror alters the amount of light falling on the photocell with the result that the output current of the amplifier is reduced and the indication given by the measuring instrument 34 will be less. If the reduced value measured in the instrument 34 falls below a predetermined danger point its pointer will touch the contact 43. On the pointer touching the contact 43, even if only for a moment, current is allowed to pass through the rectifier 41 and the coil of the relay 39. The contacts of the relay 39 will be then switched over and will be kept in this position due to the relay's self-holding properties even if, immediately afterwards, the temperature rises again and the pointer leaves the contact 43. In consequence of the operation of the relay 39, the rectifier 76 and the coil 38 will be switched off from the mains 21 and the flow diversion valve 37 will divert the milk into pipe 37a. The operator will have to make sure that the temperature has risen again before pressing contact 42 which allows the resetting of the relay 39 and of the diversion valve 37 to its original position, the contact 43 being then open.

In the case of all tubular heat exchangers the new invention can be put into effect even by simpler means which amount only to the insertion of a piece of tube that is no longer exposed to the heater fluid and on the other hand is long enough to enable the temperature detector to operate properly before the liquid enters the receiving vessel.

While it is most important that the liquid in the heat exchanger should mix as much as possible, and this is often promoted by a special design of the channel, the present invention provides means by which such a mixing does not occur between particles of the liquid that have passed the heat exchanger at too great a distance from each other in the neighbourhood of the temperature measuring device because a temperature measurement of such liquid may give misleading results as to the nature of the temperature to which each particle of liquid has been exposed during its passage through the pasteuriser.

The invention is particularly applicable to the pasteurisation of milk, but may be applied with advantage to the pasteurisation of any liquid which undergoes temperature changes of the same order of rapidity as those undergone by milk when subjected to pasteurisation temperatures.

I claim:

1. A method of pasteurising liquid including the steps of passing the liquid through a heating device to a holder for the heated liquid, measuring the temperature of the liquid during its passage from the heating device to the holder and diverting the liquid back to the heating device when the measured temperature of said liquid falls below pasteurising temperature, wherein the average speed of the liquid, after leaving the heating device, and over a portion of its flow path adjacent to and including the outlet from the heating device, is maintained at a value not substantially less than that of the liquid while passing through the heating device, and the diversion of flow is under the control of the temperature of the liquid in said portion of its flow path.

2. Apparatus for pasteurising liquids including in combination a heating device for the liquid, said heating device including a flow passage for liquid therethrough, a holder for collecting the heated liquid, and a passage between said heating device and said holder, wherein a portion of said passage adjacent to and including the outlet from the heating device has a cross-sectional area not substantially greater than that of the flow passage through the heating device, and the apparatus includes a flow diversion valve disposed in said passage, a temperature detector exposed to liquid passing through said portion of said passage and means operative under the control of said temperature detector to actuate said flow diversion valve when the temperature of the liquid passing through said portion of said passage falls below pasteurising temperature.

3. A method of pasteurising liquids according to claim 1, wherein the speed of the liquid in the portion of the flow path adjacent to and including the outlet from the heating device is maintained substantially equal to the speed at which the liquid leaves the heating device.

4. A method of pasteurising liquids according to claim 2, wherein the speed of the liquid is increased on leaving the heating device and is maintained at said increased speed in the portion of the flow path adjacent to and including the outlet from the heating device.

5. Apparatus according to claim 2, wherein the cross sectional area of the portion of the passage in which the temperature detector is disposed is less than the average cross sectional area of the flow passage through the heating device, whereby the speed of the liquid is increased on leaving the heating device.

6. Apparatus according to claim 2, wherein the cross sectional area of the portion of the passage in which the temperature detector is disposed is equal to the average cross sectional area of the flow passage through the heating device.

FRITZ LUDWIG STEGHART.

REFERENCES CITED

The following references are of record in the file of this patent:

UNITED STATES PATENTS

| Number | Name | Date |
|---|---|---|
| 2,086,338 | Sodergreen | July 6, 1937 |
| 2,236,087 | Detweiler | Mar. 25, 1941 |
| 2,239,397 | North et al. | Apr. 22, 1941 |